US007787555B2

(12) United States Patent  
Kim et al.

(10) Patent No.: US 7,787,555 B2  
(45) Date of Patent: Aug. 31, 2010

(54) MULTI-INPUT MULTI-OUTPUT SYSTEM AND METHOD FOR DEMODULATING A TRANSMITTING VECTOR IN A RECEIVER OF THE SYSTEM

(75) Inventors: Tae Joon Kim, Daejeon (KR); Ik Soo Eo, Daejeon (KR); Hyoun Kuk Kim, Ulsan (KR); Hyun Cheol Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 670 days.

(21) Appl. No.: 11/739,209

(22) Filed: Apr. 24, 2007

(65) Prior Publication Data

US 2007/0280335 A1 Dec. 6, 2007

(30) Foreign Application Priority Data

Jun. 1, 2006 (KR) .................. 10-2006-0049370

(51) Int. Cl.
*H04K 1/10* (2006.01)
*H04L 27/28* (2006.01)
*H04L 1/02* (2006.01)
*H04B 7/02* (2006.01)
*H04B 7/08* (2006.01)

(52) U.S. Cl. .................. 375/267; 375/260; 455/132
(58) Field of Classification Search .................. 375/260, 375/267

See application file for complete search history.

(56) References Cited

U.S. PATENT DOCUMENTS

2004/0252632 A1* 12/2004 Bourdoux et al. ............ 370/210

(Continued)

FOREIGN PATENT DOCUMENTS

EP 1434365 6/2004

(Continued)

OTHER PUBLICATIONS

Waters, D., et al., "The Chase Family of Detection Algorithms for Multiple-Input Multiple-Output Channels." 2004. *IEEE Communications Society, Globecom* 2004, pp. 2635-2639.

(Continued)

*Primary Examiner*—David C Payne
*Assistant Examiner*—Erin M File
(74) *Attorney, Agent, or Firm*—Ladas & Parry LLP

(57) ABSTRACT

Provided is a receiver of a multi-input multi-output system using multiple antennas, the receiver including: a first multiplying unit for multiplying a vector r received via the antenna by a Hermitian matrix Q; a candidate transmitting vector generating unit for detecting a signal on a lowest modulation order transmitting antenna from the received vector y output from the first multiplying unit, creating as many symbol candidates as the modulation order of the detected signal, and generating a candidate transmitting vector using each symbol candidate; a transmitting vector determining unit for obtaining a distance between each candidate transmitting vector generated by the candidate transmitting vector generating unit and the received vector y to determine a final transmitting vector; and a demodulating unit for demodulating the final transmitting vector determined by the transmitting vector determining unit. Since the receiver detects a transmitting vector with reference to a signal on a lowest modulation order transmitting antenna, the receiver can have a simpler structure.

15 Claims, 4 Drawing Sheets

U.S. PATENT DOCUMENTS

2005/0239509 A1    10/2005   Li et al.
2006/0245348 A1*   11/2006   Ojard ......................... 370/208
2006/0256805 A1*   11/2006   Cho et al. .................. 370/431

FOREIGN PATENT DOCUMENTS

| KR | 1020020062673 | 7/2002 |
|---|---|---|
| KR | 10-2003-0096927 | 12/2003 |
| KR | 1020040013463 | 2/2004 |
| KR | 10-2004-0053435 | 6/2004 |
| KR | 1020060012825 | 2/2006 |
| KR | 1020060068082 | 6/2006 |
| KR | 1020060108450 | 10/2006 |

OTHER PUBLICATIONS

Golden, G.D., et al., "Detection algorithm and initial laboratory results using V-BLAST space-time communication architecture." Jan. 7, 1999. *Electronics Letters*, vol. 35, No. 1, pp. 14-16.

Wang, N., et al., "Minimum BER Power Allocation for MIMO Spatial Multiplexing Systems." 2005. *IEEE 0-7803-8938-7/05*, pp. 2282-2286.

\* cited by examiner

| RECEIVER | NUMBER OF COMPLEX NUMBER OPERATIONS | $N_t = N_r = 4$ $q=2$ |
|---|---|---|
| ZF-DF | $2N_t^2 N_r + N_t^2/2 + 5N_t N_r/2$ | 176(29.7%) |
| ZF-ODF | $N_t^3 N_r + N_t^4/12 + 7N_t^2 N_r/2 + N_t^2/6$ $+ 13N_t N_r/2 - 3N_t/4 - 4N_r + 1$ | 590(100%) |
| THE PRESENT INVENTION | $2N_t^2 N_r + N_t^2/2 + 5N_t N_r/2$ $+ q(2N_t^2 + 2N_t N_r + N_t - 1)$ | 310(52.5%) |

MULTI-INPUT MULTI-OUTPUT SYSTEM AND METHOD FOR DEMODULATING A TRANSMITTING VECTOR IN A RECEIVER OF THE SYSTEM

CROSS-REFERENCE TO RELATED APPLICATION

This application claims priority to and the benefit of Korean Patent Application No. 2006-49370, filed Jun. 1, 2006, the disclosure of which is incorporated herein by reference in its entirety.

BACKGROUND

1. Field of the Invention

The present invention relates to a multi-input multi-output system and a method for demodulating a transmitting vector in a receiver of the system in which the receiver detects a transmitting vector from a received vector received via multiple antennas and demodulates the detected transmitting vector.

2. Discussion of Related Art

A radio channel having a multi-path is known to have high channel capacity, and it is expected that multi-input multi-output (MIMO) systems will be widely used in the future. In an MIMO system, proper space-time processing provides ample multi-path scattering on a communication channel, as is already known.

The Diagonal-Bell Labs Layered Space-Time (D-BLAST) system was introduced by Foschini in 1996. Here, when several antennas for a transmitter and a receiver and a diagonal arrangement of codes are used for communication, respective code blocks are propagated while being diagonally crossed in time and space. In this case, if a channel environment is a Rayleigh scattering environment and a transmitter and a receiver have the same number of antennas, a transfer rate linearly increases with the number of antennas, eventually approaching 90% of Shannon's channel capacity. This system, however, is complex and thus difficult to implement.

Meanwhile, the Vertical-Bell Labs Layered Space-Time (V-BLAST) system was suggested by Wolniansky in 1998. This system simplifies a conventional D-BLAST system by means of hardware implementation, but cannot accomplish maximum diversity and thus has deteriorated performance.

FIG. 1 illustrates a schematic configuration of a conventional MIMO communication system using V-BLAST;

Referring to FIG. 1, a MIMO communication system using V-BLAST includes a transmitter 100 and a receiver 110.

The transmitter 100 includes a modulating unit 102 for modulating data to be transmitted using the same modulation system by applying the same modulation system to respective antennas, and the antennas for transmitting the modulated data via channels.

The receiver 110 includes antennas for receiving a vector r via the channels, a first multiplying unit 112 for multiplying the vector r received via the antennas by a Hermitian matrix Q, a decision feedback (DF) detecting unit 114 for performing decision feedback on a signal output from the first multiplying unit 112 to detect a transmitting vector therefrom, and a demodulating unit 116 for demodulating the transmitting vector output from the DF detecting unit 114 based on the system used for modulation at the modulating unit 102.

The DF detecting unit 114 detects a signal having the highest signal-to-noise ratio among the signals received via the transmitting antennas and detects the transmitting vector by removing previous-stage interference at each stage. The DF detecting unit 114 then inputs the detected transmitting vector to the demodulating unit 116, which demodulates the transmitting vector received from the DF detecting unit 114.

However, in such a conventional V-BLAST system, since all transmitting antennas use the same modulation system and power, high performance is achieved at the cost of a receiver having a complex structure.

Furthermore, in a receiver, a signal detection order for detecting a transmitting vector changes each time a channel is switched.

SUMMARY OF THE INVENTION

The present invention is directed to implementation of a multi-input multi-output system and a method for demodulating a transmitting vector in a receiver of the system in which a signal detection order for detecting a transmitting vector is not dependent on a channel.

The present invention is also directed to implementation of a multi-input multi-output system and a method for demodulating a transmitting vector in a receiver of the system which are capable of easily detecting a transmitting vector which is transmitted with a different modulation and power coefficient assigned to each antenna.

One aspect of the present invention provides a multi-input multi-output system including: a transmitter for modulating data to be transmitted according to a modulation system and power allocation coefficient assigned to each antenna, adjusting power of the data, and transmitting the data via a corresponding antenna; and a receiver for detecting a signal on a lowest modulation order transmitting antenna from a vector received from the transmitter, creating as many symbol candidates as a modulation order of the detected signal, performing a decision feedback detecting process with reference to each symbol candidate to generate a candidate transmitting vector, and obtaining a distance between the generated candidate transmitting vector and the received vector to determine a final transmitting vector.

Another aspect of the present invention provides a receiver of a multi-input multi-output system using multiple antennas, the receiver including: a first multiplying unit for multiplying a vector r received via the antenna by a Hermitian matrix Q; a candidate transmitting vector generating unit for detecting a signal on a lowest modulation order transmitting antenna from the received vector y output from the first multiplying unit, creating as many symbol candidates as the modulation order of the detected signal, and performing a decision feedback with reference to each symbol candidate on the vector y output from the first multiplying unit to generate a candidate transmitting vector; a transmitting vector determining unit for obtaining a distance between each candidate transmitting vector generated by the candidate transmitting vector generating unit and the received vector y to determine a final transmitting vector; and a demodulating unit for demodulating the transmitting vector determined by the transmitting vector determining unit.

Still another aspect of the present invention provides a method for detecting a transmitting vector in a receiver of a multi-input multi-output system, the method including the steps of: detecting a signal on a lowest modulation order transmitting antenna from a vector received via multiple antennas; creating as many symbol candidates as a modulation order of the detected signal; performing a decision feedback process with reference to each created symbol candidate to generate a candidate transmitting vector; and obtaining a distance between each generated candidate transmitting vector and the received vector to determine a final transmitting vector.

Yet another aspect of the present invention provides a method for demodulating a transmitting vector in a receiver of a multi-input multi-output system, the method including the steps of: storing information about a modulation system and power allocation coefficient for each antenna contained in feedback information, which is transmitted and received to and from a transmitter upon initial channel establishment; creating a first vector r received via the antenna by a Hermitian matrix Q to generate a second vector y; detecting a signal on a lowest modulation order transmitting antenna from the created second vector y, and creating as many symbol candidates as a modulation order of the detected signal; performing decision feedback on the second vector y with reference to each created symbol candidate to generate a candidate transmitting vector; measuring a distance between each generated candidate transmitting vector and the second vector y to determine a final transmitting vector; and demodulating the detected final transmitting vector.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1:
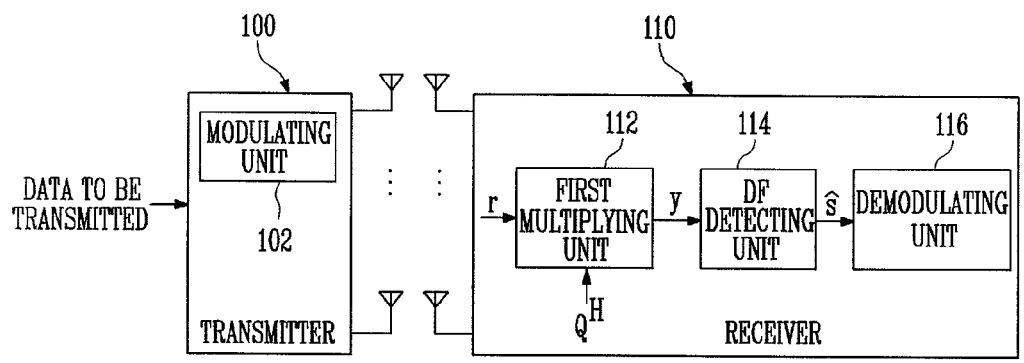
FIG. 1 illustrates a schematic configuration of a conventional MIMO communication system using V-BLAST.
Figure 2:
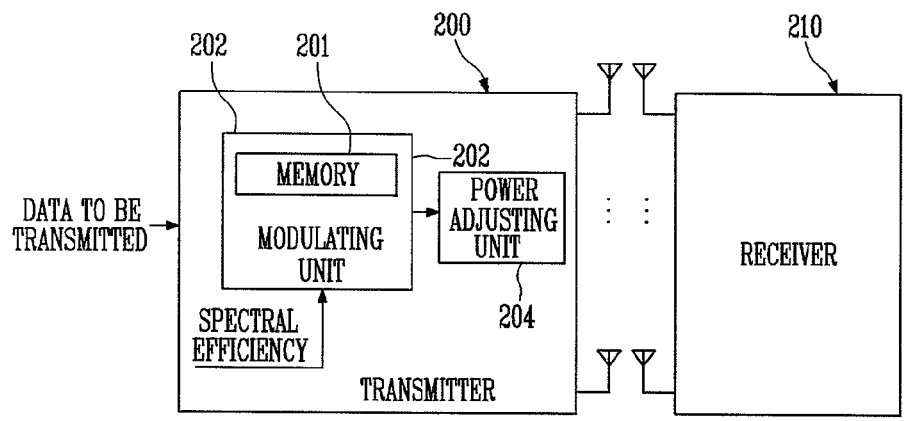
FIG. 2 illustrates a schematic configuration of a MIMO communication system using V-BLAST according to the present invention.
Figure 3:
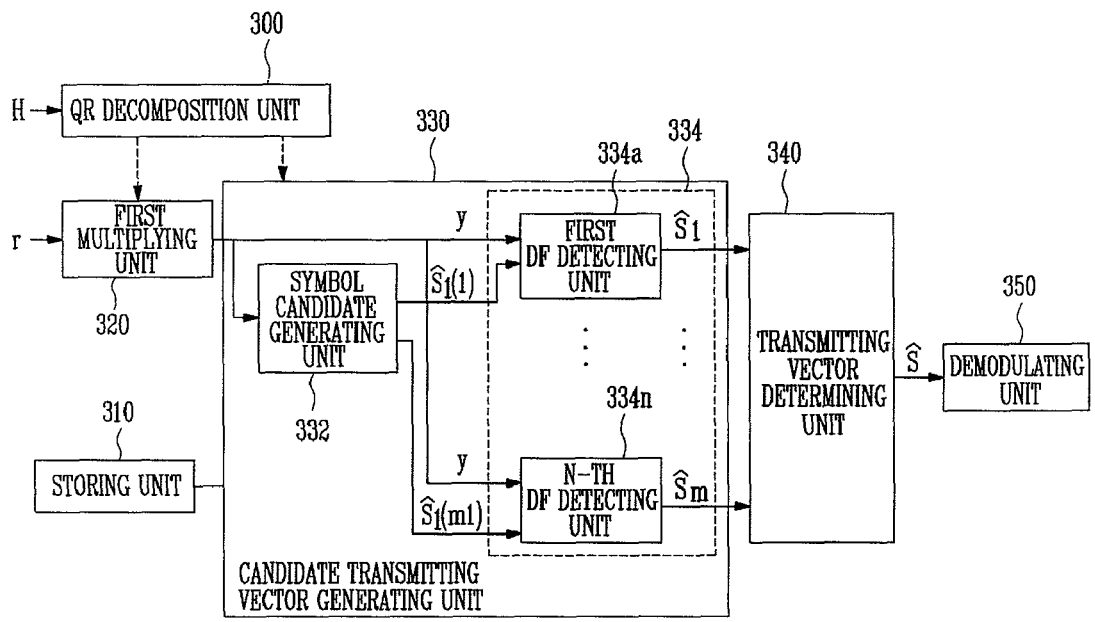
FIG. 3 illustrates a schematic configuration of a receiver shown in FIG. 2.
Figure 4:
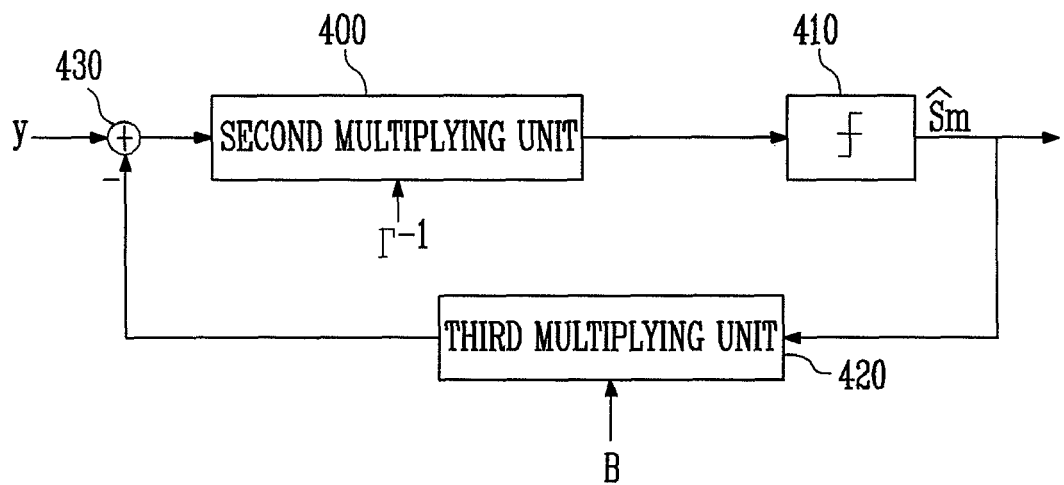
FIG. 4 illustrates a schematic configuration of a DF detecting unit shown in FIG. 3.

FIG. 2 illustrates a schematic configuration of a MIMO communication system using V-BLAST according to the present invention, FIG. 3 illustrates a schematic configuration of a receiver shown in FIG. 2, and FIG. 4 illustrates a schematic configuration of a DF detecting unit shown in FIG. 3.

Referring to FIG. 2, a MIMO communication system using V-BLAST includes a transmitter 200 and a receiver 210.

The transmitter 200 applies a different modulation system and power allocation coefficient for each antenna to data to be transmitted.

The transmitter 200 includes a modulating unit 202 for modulating data to be transmitted using a different modulation system for each antenna, a power adjusting unit 204 for adjusting power of the data, which is modulated using a different modulation system for each antenna at the modulating unit 202, according to a different power allocation coefficient, and an antenna unit for transmitting, over a channel, the data whose power is adjusted at the power adjusting unit 204.

The modulating unit 202 includes a memory 201 storing a different modulation system and power allocation coefficient for each antenna in a lookup table. When data to be transmitted is input, the modulating unit 202 reads out the modulation system and power allocation coefficient for each antenna from the memory 201 and applies them to the data to be transmitted so that the data is transmitted via each antenna.

Here, the data to be transmitted refers to scrambled, encoded, or interleaved data to be transmitted by the transmitter. After receiving such data, the modulating unit 202 and the power adjusting unit modulate the data and adjust transmission power of the data using a different modulation system and power allocation coefficient for each antenna.

Modulation systems and power allocation coefficients for antennas in the memory 201 are calculated once upon system setup and then stored in a lookup table. That is, the modulation system and the power allocation coefficient are obtained when information about spectral efficiency and the number of transmitting antennas are input, and once spectral efficiency is determined, the modulation system and the power allocation coefficient are not changed.

Because both the transmitter 200 and the receiver 210 have the lookup table, the receiver 210 already knows a modulation system and power allocation coefficient for each antenna with respect to given spectral efficiency.

According to another aspect of the present invention, the memory 201, which stores a modulation system and power allocation coefficient for each antenna, may be external to the modulating unit 202.

The receiver 210 receives signals from m transmitting antennas via n receiving antennas, detects all data streams from the signals, and demodulates the data streams.

That is, the receiver 210 detects a signal on a lowest modulation order transmitting antenna from the signal received via the antenna, and creates as many symbol candidates as a modulation order of the detected signal.

The receiver 210 then performs a DF detecting process with reference to each created symbol candidate to generate a candidate transmitting vector, obtains a distance between each generated candidate transmitting vector and the received vector, and determines a candidate transmitting vector having the shortest distance as a final transmitting vector. The receiver 210 then demodulates the determined final transmitting vector.

The receiver 210 performing the above function will be described in greater detail with reference to FIG. 3.

Referring to FIG. 3, the receiver 210 comprises a QR decomposition unit 300 for performing QR decomposition on a channel matrix H, a storing unit 310 for storing a modulation system and power allocation coefficient for each transmitting antenna, an antenna for receiving a vector via a channel, a first multiplying unit 320 for multiplying the vector r received via the antenna by a Hermitian matrix Q, a candidate transmitting vector generating unit 330 for detecting a signal on a lowest modulation order transmitting antenna from the vector y output from the first multiplying unit 320, creating as many symbol candidates as a modulation order of the detected signal, and performing decision feedback on a vector y output from the first multiplying unit 320 with reference to the symbol candidate to generate a candidate transmitting vector, a transmitting vector determining unit 340 for obtaining a Euclidean distance between each candidate transmitting vector generated at the candidate transmitting vector generating unit 330 and the received vector and determining a candidate transmitting vector having the smallest distance as a final transmitting vector, and a demodulating unit 350 for demodulating the transmitting vector determined at the transmitting vector determining unit 340.

A QR decomposition result of the channel matrix H at the QR decomposition unit 300 is H=QR, wherein Q is a unitaty matrix and R is an upper triangular matrix.

The modulation system and power allocation coefficient for each transmitting antenna stored in the storing unit 310 are received when the receiver transmits and receives feedback information to and from the transmitter 200 for first channel establishment with the transmitter 200. Accordingly, the modulation system and power allocation coefficient for each transmitting antenna stored in the storing unit 310 are the same as those stored in the transmitter 200. In this case, the storing unit may be a read only memory (ROM).

Accordingly, if a modulation system and power allocation coefficient for each transmitting antenna is stored in the storing unit 310 while the receiver 210 is communicating the feedback information with the transmitter 200, the receiver 210 determines a lowest modulation order among the stored modulation systems, and sets a number of DF detecting units 334 corresponding to the determined lowest modulation order to operate.

The candidate transmitting vector generating unit 330 comprises a symbol candidate generating unit 332 for detecting a signal on a lowest modulation order transmitting antenna from the received vector output from the first multiplying unit 320 and creating as many symbol candidates as a modulation order of the detected signal, and first DF detecting unit 334a to an n-th DF detecting unit 334n (hereinafter "DF detecting unit 334") for performing a DF detecting process with reference to each symbol candidate created at the symbol candidate generating unit 332 to generate a candidate transmitting vector.

The symbol candidate generating unit 332 serves to create as many symbol candidates as a modulation order of a signal on a lowest modulation order transmitting antenna. For example, the symbol candidate generating unit 332 creates four symbol candidates when the modulation order of the detected transmitting antenna signal is four.

In this case, because the signal on the lowest modulation order transmitting antenna is present at a predetermined location of the transmitting vector output via the transmitting antenna, the symbol candidate generating unit 332 can easily detect the signal on the lowest modulation order transmitting antenna from the received vector.

In this case, the symbol candidate generating unit 332 can determine whether the detected transmitting antenna signal corresponds to the modulation system having the lowest modulation order among the antenna modulation systems stored in the storing unit 310 to check whether the detected signal is correct.

The DF detecting unit 334 performs a DF process with reference to each symbol candidate created at the symbol candidate generating unit 332 to generate a candidate transmitting vector, and the DF detecting units 334 may correspond in number to the symbol candidates.

That is, the number of DF detecting units 334 may correspond to the lowest modulation order among the modulation systems used by the transmitter 200.

Since each DF detecting unit 334 performs a DF process with reference to each symbol candidate created at the symbol candidate generating unit 332, it does not detect a lowest modulation order signal from the transmitting antenna signal and detects other signals in the DF system using as many symbol candidates as the modulation order.

For example, if the lowest modulation order applied to the modulation systems used by the transmitter 200 is four, the number of DF detecting units 334 may be four.

Accordingly, the symbol candidate generating unit 332 creates four symbol candidates, and inputs a first symbol candidate among the created symbol candidates to a first DF detecting unit, a second symbol candidate to a second DF detecting unit, a third symbol candidate to a third DF detecting unit, and a fourth symbol candidate to a fourth DF detecting unit.

The first DF detecting unit then performs a DF process with reference to the first symbol candidate to detect a first candidate transmitting vector, the second DF detecting unit performs a DF process with reference to the second symbol candidate to detect a second candidate transmitting vector, the third DF detecting unit performs a DF process with reference to the third symbol candidate to detect a third candidate transmitting vector, and the fourth DF detecting unit performs a DF process with reference to the fourth symbol candidate to detect a fourth candidate transmitting vector.

When the number of DF detecting units 334 is m1 as described above, m1 candidate transmitting vectors are generated.

A method for detecting a candidate transmitting vector using a symbol candidate at the DF detecting unit 334 will now be described in greater detail with reference to FIG. 4.

Referring to FIG. 4, the DF detecting unit 334 includes a second multiplying unit 400 for multiplying the vector y output from the first multiplying unit 320 by $\Gamma^-$, a determining unit 410 for outputting a candidate transmitting vector, i.e., a determination value for determining the value output from the second multiplying unit 400 according to a certain determination criterion, a third multiplying unit 420 for multiplying the candidate transmitting vector output from the determining unit 410 by an off-diagonal term B, and a summing unit 430 for summing a vector output from the third multiplying unit 420 and the signal output from the first multiplying unit 320 to remove an interference component from a signal detected at a previous stage.

Here, $\Gamma^-$ indicates multiplying diagonal terms of an R matrix in reverse order. That is, because the R matrix is an upper triangular matrix, a transmission signal corresponding to a last row of the matrix is first detected.

$\Gamma$ indicates diag(R), and B indicates R–$\Gamma$.

A method for detecting a transmitting vector in a receiver 210 for the above multi-input multi-output system comprising $N_t$ transmitting antennas and $N_r$ receiving antennas will now be described.

A received vector r input via the receiving antenna is represented by Equation 1:

$$r = H's' + n, \qquad \text{Equation 1}$$

wherein r indicates a received vector $N_r \times 1$, H' indicates a channel matrix $N_r \times N_t$, s' indicates a transmitting vector $N_t \times 1$, and n indicates a noise vector $N_r \times 1$. For the transmitting vector s', each antenna uses a different modulation system and power. Here, s'=Ps, and a matrix P is a diagonal matrix whose diagonal terms are a power allocation coefficient $P_i$ for each antenna.

In particular, a modulation system having the lowest modulation order is arranged at a last row of s'. If the modulation system having the lowest modulation order is not arranged at the last row, the receiver 210 needs to know a row at which the modulation system having the lowest order is located.

When the channel transfer function matrix H containing channel information in Equation 1 is subject to QR decomposition, it can be represented as the following: H=QR, where Q is a unitary matrix and R is an upper triangular matrix.

When a QR decomposition result of the channel transfer function matrix H is applied to Equation 1, r=QRs+n.

However, the receiver 210 will receive information about a modulation system and power allocation coefficient for each antenna of the transmitter 200 while first transmitting and receiving feedback information to and from the transmitter 200. Here, different power allocation coefficients used for respective antennas of the transmitter 200 need to be normalized. Accordingly, if $HP^{-1}$ is substituted for the channel matrix H' and the received vector of Equation 1 is multiplied by a Hermitian matrix Q at the first multiplying unit 320, Equation 1 becomes Equation 2:

$$r=H'S'+n=QRs+n$$

$$y=Q^H r=Rs+n' \quad \text{Equation 2}$$

It can be seen from Equation 2 that signal detection can be made using the DF-based receiver since the R matrix is upper triangular.

As in Equation 2, the vector y output from the first multiplying unit 320 is input to the DF detecting unit 334.

The DF detecting units 334 corresponding in number to the lowest modulation order are activated and receive the symbol candidate generated at the symbol candidate generating unit 332 and the vector y.

For example, if BPSK has the lowest modulation order, two symbol candidates are created and two DF detecting units 334 are activated.

Accordingly, a first symbol candidate and the vector y are input to the first DF detecting unit, and a second symbol candidate and the vector y are input to the second DF detecting unit. Each of the first and second DF detecting units performs a DF process with reference to the input symbol candidate to generate a candidate transmitting vector. That is, the first DF detecting unit generates a first candidate transmitting vector and the second DF detecting unit generates a second candidate transmitting vector.

A method for generating the candidate transmitting vector at the DF detecting unit 334 will now be described.

The second multiplying unit 400 multiplies the vector y output from the first multiplying unit 320 by Γ⁻ with reference to the symbol candidate generated at the symbol candidate generating unit 332 and inputs the result to the determining unit 410.

The determining unit 410 then receives the value output from the second multiplying unit 400, outputs a candidate transmitting vector, i.e., a determination value by applying an optimal filter tap coefficient according to a certain determination criterion, and inputs the candidate transmitting vector to the transmitting vector determining unit 340 and the third multiplying unit 420.

In this case, the value of a signal in any stage is represented by Equation 3:

$$y_i = \underbrace{R_{ii}s_i}_{\text{desired signal}} + \underbrace{\sum_{j<i} R_{ij}s_j}_{\text{interference component}} + n'_i, \ 1 \le i \le N_t \quad \text{Equation 3}$$

-continued $$\begin{cases} |R_{ii}|^2 \sim \chi^2_{2(N_r-N_t+1)}, \\ |R_{ij}|^2 \sim \chi^2_2, i \ne j \end{cases},$$

where $R_{ii}S_i$ indicates a desired signal, and $$\sum_{j<i} R_{ij}s_j$$

indicates an interference component.

It can be seen from Equation 3 that there is a difference in diversity gain exhibiting maximum performance at each stage of the DF-based receiver. Because the R matrix is upper triangular matrix, a transmission signal corresponding to a last row of the matrix is first detected.

The third multiplying unit 420 multiplies the candidate transmitting vector output from the determining unit 410 by an off-diagonal term B and inputs the resulting vector to the summing unit 430. The summing unit 430 sums the vector output from the third multiplying unit 420 and the signal output from the first multiplying unit 320 to remove an interference component from a signal detected at a previous stage.

A signal as represented by Equation 4 is detected by removing the interference component from the previous stage through the above process:

$$y_i = R_{ii}s_i + \sum_{j<i} R_{ij}(s_j - \hat{s}_j) + n'_i, \ 1 \le i \le N_t \quad \text{Equation 4}$$

A signal from which an interference component is removed is input to the second multiplying unit 400, and a candidate transmitting vector is detected by the determining unit 410.

As described above, the DF detecting unit 334 repeatedly performs the DF process on symbol candidates corresponding in number to a modulation order of a first detection object, i.e., a bottom transmitting antenna (a lowest modulation order transmitting antenna), to detect a candidate transmitting vector. That is, the DF detecting unit 334 performs the DF process using $\hat{s}_1(1)$ to $\hat{s}_1(m_1)$ to generate $m_1$ candidate transmitting vectors.

For example, it is assumed that the modulation system in the transmitting antenna includes BPSK, QAM, and 64QAM modulation systems.

When channel establishment with the transmitter 200 is completed, the receiver 210 checks a modulation system for each antenna of the transmitter 200 and stores the modulation system in the storing unit 310.

The candidate transmitting vector generating unit 330 determines that a signal on a lowest modulation order transmitting antenna among the stored modulation systems is modulated in the BPSK system and selects the signal from the received vector.

The candidate transmitting vector generating unit 330 then creates two symbol candidates corresponding to a modulation order of the selected BPSK, and performs a DF detecting process with reference to the created symbol candidate. In this case, two DF detecting unit 334 may be used. Each DF detecting unit 334 performs the DF process with reference to each input symbol candidate to detect a candidate transmitting vector.

The m1 candidate transmitting vectors generated by the DF detecting unit 334 as described above are sent to the transmitting vector determining unit 340.

The transmitting vector determining unit 340 measures a distance between each candidate transmitting vector output from the DF detecting unit 334 and the received vector y and determines a vector having the shortest distance as a final transmitting vector, as shown in Equation 5.

$$\hat{s} = \arg\min_{q \in \{1,2,\ldots,m_1\}} \|y - R\hat{s}_q\|^2 \quad \text{Equation 5}$$

The final transmitting vector determined using Equation 5 is input to the demodulating unit 350.

The demodulating unit 350 demodulates the transmitting vector determined at the transmitting vector determining unit 340.

Figure 5:
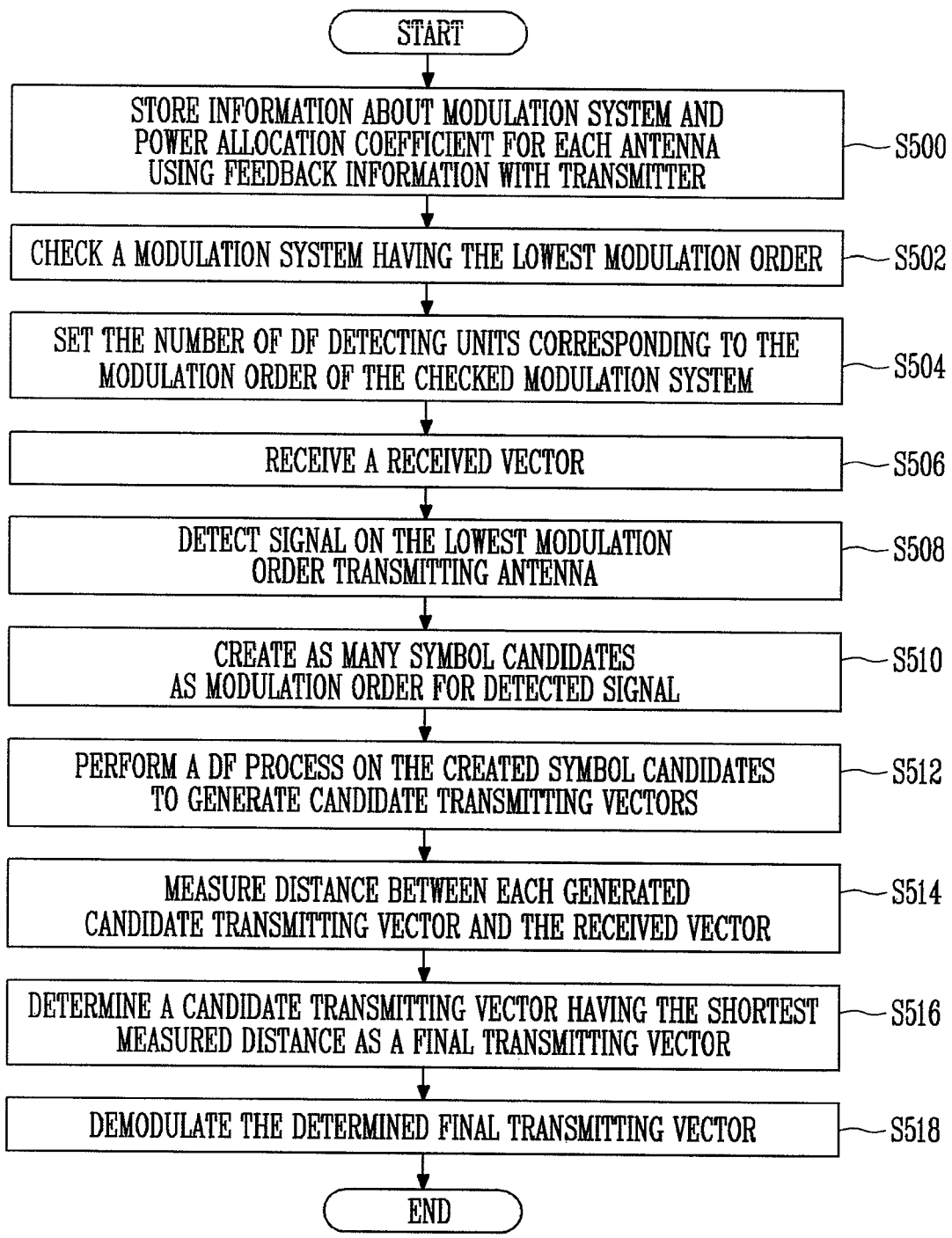
FIG. 5 is a flowchart illustrating a method for demodulating a transmitting vector in a receiver according to the present invention.

FIG. 5 is a flowchart illustrating a method for demodulating a transmitting vector in a receiver according to the present invention;

Referring to FIG. 5, the receiver receives information about a modulation system and power allocation coefficient for each antenna using feedback information communicated with the transmitter and stores them in the storing unit (S500).

That is, the transmitter transmits and receives feedback information for channel establishment to and from the receiver in order to transmit data to the receiver. Here, the transmitter transmits the pre-stored modulation system and power allocation coefficient for each antenna to the receiver.

The receiver then stores the modulation system and power allocation coefficient for each antenna, which are received from the transmitter, in the storing unit.

Following step 500, the receiver check a modulation system having the lowest modulation order with reference to the stored modulation systems for each antenna (S502), and sets the number of DF detecting units corresponding to the modulation order of the checked modulation system to operate (S504).

When a vector is received (S506), the receiver then detects a signal on a lowest modulation order transmitting antenna (S508), and creates as many symbol candidates as the modulation order for the detected signal (S510). Here, a signal on a lowest modulation order transmitting antenna exists at a predetermined location, and the receiver can easily detect the signal since it knows the location.

The receiver then performs a DF process on each created symbol candidate and generates candidate transmitting vectors corresponding to the number of the symbol candidates (S512).

The receiver then measures distance between each generated candidate transmitting vector and the received vector (S514), and determines a vector having the shortest measured distance as a final transmitting vector (S516).

The receiver then demodulates the determined final transmitting vector and outputs a received signal (S518).

Figures 6, 7:
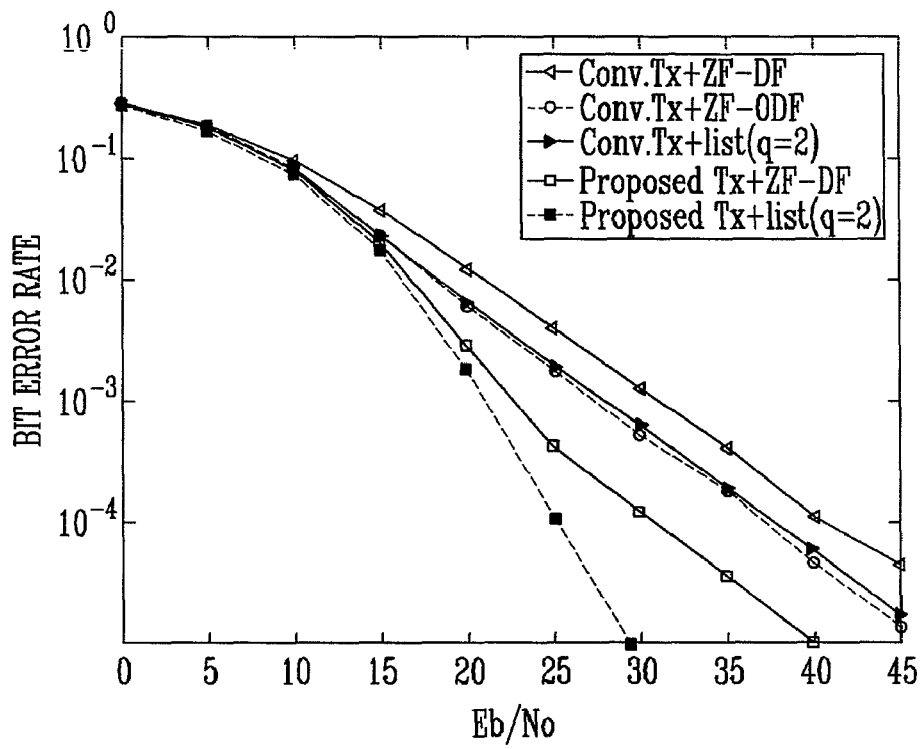
FIG. 6 is a graph illustrating performance of a receiver in a transmission system according to the present invention.
FIG. 7 illustrates complexity of each receiver according to the present invention.

FIG. 6 is a graph illustrating performance of a receiver in a transmission system according to the present invention.

Referring to FIG. 6, for a bit error rate of $10^{-4}$, the receiver according to the present invention provides a performance gain that is higher by about 13 dB compared to Zero Forcing-Ordered Decision Feedback (ZF-ODF) and higher by about 8 dB compared to ZF-DF.

FIG. 7 illustrates complexity of each receiver according to the present invention.

Referring to FIG. 7, the receiver according to the present invention requires about 52.5% of the complexity of ZF-ODF. It can be also seen that the receiver can provide a higher performance gain with less complexity than ZF-ODF.

As described above, according to the present invention, it is possible to provide a multi-input multi-output system having a simpler structure, and a method for demodulating a transmitting vector in a receiver of the system, since the receiver detect the transmitting vector with reference to a signal on a lowest modulation order transmitting antenna.

According to the present invention, it is also possible to provide a multi-input multi-output system and a method for demodulating a transmitting vector in a receiver of the system which are capable of easily detecting a transmitting vector which is transmitted with a different modulation and power coefficient assigned to each antenna.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A receiver of a multi-input multi-output system using multiple antennas, the receiver comprising:
   a first multiplying unit for multiplying a vector r received via the antenna by a Hermitian matrix Q;
   a candidate transmitting vector generating unit for detecting a signal on a lowest modulation order transmitting antenna from a received vector y output from the first multiplying unit, creating as many symbol candidates as the modulation order of the detected signal, and generating a candidate transmitting vector using each symbol candidate;
   a transmitting vector determining unit for obtaining a distance between each candidate transmitting vector generated by the candidate transmitting vector generating unit and the received vector y to determine a final transmitting vector;
   a demodulating unit for demodulating the transmitting vector determined by the transmitting vector determining unit; and
   a decision feedback (DF) detecting unit comprising:
      a second multiplying unit for multiplying the vector y output from the first multiplying unit by $\Gamma^-$, wherein $\Gamma^-$ indicates multiplying diagonal terms of an R matrix in reverse order;
      a determining unit for receiving a value output from the second multiplying unit and outputting the candidate transmitting vector according to a certain determination criterion;
      a third multiplying unit for multiplying the candidate transmitting vector output from the determining unit by an off-diagonal term B, wherein B indicates R–$\Gamma$; and
      a summing unit for summing vector output from the third multiplying unit and the signal output from the first multiplying unit to remove an interference component from a signal detected at a previous stage.

2. The receiver of claim 1, further comprising a storing unit for storing a modulation system and power allocation coefficient for each transmitting antenna.

3. The receiver of claim 1, wherein the received vector r is equal to H's'+n, where H' is equal to $HP^{-1}$, s' (transmitting vector) is Ps, n is a noise vector, and a matrix P is a diagonal matrix having diagonal terms composed of a power allocation coefficient $P_i$ for each antenna.

4. The receiver of claim 1, wherein the received vector y output from the first multiplying unit is equal to Rs+n, where R is an upper triangular matrix.

5. The receiver of claim 1, wherein the candidate transmitting vector generating unit comprises:
a symbol candidate generating unit for detecting the signal on the lowest modulation order transmitting antenna from the received vector output from the first multiplying unit, and creating as many symbol candidates as the modulation order of the detected signal; and
wherein the DF detecting unit performs a decision feedback detecting process with reference to each symbol candidate created by the symbol candidate generating unit to generate the candidate transmitting vector.

6. The receiver of claim 1, wherein the signal on the lowest modulation order transmitting antenna exists at a predetermined location of the received vector.

7. The receiver of claim 5, wherein the DF detecting unit generates as many candidate transmitting vectors as the symbol candidates generated by the symbol candidate generating unit.

8. The receiver of claim 1, wherein the transmitting vector determining unit obtains an Euclidean distance between each candidate transmitting vector and the received vector y, and determines a candidate transmitting vector having the smallest distance as a final transmitting vector.

9. A method for detecting a transmitting vector in a receiver of a multi-input multi-output system, the method comprising the steps of:
detecting a signal on a lowest modulation order transmitting antenna from a vector received via multiple antennas;
creating as many symbol candidates as a modulation order of the detected signal;
generating a candidate transmitting vector by performing a decision feedback process with reference to each created symbol candidate;
obtaining a distance between each generated candidate transmitting vector and the received vector to determine a final transmitting vector; and
wherein the decision feedback process comprises the steps of:
using a second multiplying unit for multiplying a vector y output from a first multiplying unit by $\Gamma^-$;
using a determining unit for receiving a value output from the second multiplying unit and outputting the candidate transmitting vector according to a certain determination criterion;
using a third multiplying unit for multiplying the candidate transmitting vector output from the determining unit by an off-diagonal term B; and
using a summing unit for summing a vector output from the third multiplying unit and the signal output from the first multiplying unit to remove an interference component from a signal detected at a previous stage.

10. The method of claim 9, wherein the step of generating a candidate transmitting vector comprises the step of generating as many candidate transmitting vectors as the created symbol candidates.

11. The method of claim 9, wherein the distance between the candidate transmitting vector and the received vector is obtained using a Euclidean distance, and a candidate transmitting vector having the smallest distance is determined as a final transmitting vector.

12. A method for demodulating a transmitting vector in a receiver of a multi-input multi-output system, the method comprising the steps of:
storing information about a modulation system and power allocation coefficient for each antenna contained in feedback information, which is transmitted and received to and from a transmitter upon initial channel establishment;
creating a first vector received r via the antenna by a Hermitian matrix Q to generate a second vector y;
detecting a signal on a lowest modulation order transmitting antenna from the created second vector y, and creating as many symbol candidates as a modulation order of the detected signal;
generating a candidate transmitting vector by performing decision feedback on the second vector with reference to each created symbol candidate;
determining a final transmitting vector by measuring a distance between each detected candidate transmitting vector and the second vector y;
demodulating the detected final transmitting vector; and
wherein the decision feedback process comprises the steps of:
using a second multiplying unit for multiplying the vector y output from a first multiplying unit by $\Gamma^-$;
using a determining unit for receiving a value output from the second multiplying unit and outputting the candidate transmitting vector according to a certain determination criterion;
using a third multiplying unit for multiplying the candidate transmitting vector output from the determining unit by an off-diagonal term B; and
using a summing unit for summing a vector output from the third multiplying unit and the signal output from the first multiplying unit to remove an interference component from a signal detected at a previous stage.

13. A multi-input multi-output system comprising:
a transmitter for modulating data to be transmitted according to a modulation system and power allocation coefficient assigned to each antenna, adjusting power of the data, and transmitting the data via a corresponding antenna; and
a receiver for detecting a signal on a lowest modulation order transmitting antenna from a vector received via multiple antennas, creating as many symbol candidates as a modulation order of the detected signal, performing a decision feedback detecting process with reference to each symbol candidate to generate a candidate transmitting vector, and obtaining a distance between the generated candidate transmitting vector and the received vector to determine a final transmitting vector, the receiver comprising:
a first multiplying unit for multiplying a vector r received via the antenna by a Hermitian matrix Q; and
a DF detecting unit comprising:
a second multiplying unit for multiplying the vector y output from the first multiplying unit by $\Gamma^-$, wherein $\Gamma^-$ indicates multiplying diagonal terms of an R matrix in reverse order;
a determining unit for receiving a value output from the second multiplying unit and outputting the candidate transmitting vector according to a certain determination criterion;
a third multiplying unit for multiplying the candidate transmitting vector output from the determining unit by an off-diagonal term B, wherein B indicates R–$\Gamma$; and
a summing unit for summing a vector output from the third multiplying unit and the signal output from the first multiplying unit to remove an interference component from a signal detected at a previous stage.

14. The system of claim 13, wherein the final transmitting vector is a candidate transmitting vector having the smallest Euclidean distance between the candidate transmitting vector and the received vector.

15. The system of claim 13, wherein the receiver stores a modulation system and power allocation coefficient for each antenna corresponding to the modulation system and power allocation coefficient for each antenna stored in the transmitter.

* * * * *